United States Patent
Cui (10) Patent No.: US 9,797,622 B2
(45) Date of Patent: Oct. 24, 2017

(54) COIL AND SERPENTINE BENT FIN TUBE CONDENSING HEAT EXCHANGER

(71) Applicant: Suzhou CQ Heat Exchanger Co., Ltd., Suzhou Industrial Park (CN)

(72) Inventor: Shuqing Cui, Fitchburg, WI (US)

(73) Assignee: Suzhou CQ Heat Exchanger Co., Ltd., Suzhou Industrial Park (CN)

( * ) Notice: Subject to any disclaimer, the term of this patent is extended or adjusted under 35 U.S.C. 154(b) by 0 days.

(21) Appl. No.: 14/495,087

(22) Filed: Sep. 24, 2014

(65) Prior Publication Data

US 2015/0007780 A1  Jan. 8, 2015

Related U.S. Application Data

(63) Continuation of application No. PCT/CN2013/083873, filed on Sep. 21, 2013.

(30) Foreign Application Priority Data

Sep. 21, 2012  (CN) .......................... 2012 1 0355221

(51) Int. Cl.
*F24H 1/12* (2006.01)
*F24H 8/00* (2006.01)
(Continued)

(52) U.S. Cl.
CPC ............... *F24H 1/124* (2013.01); *F24H 1/41* (2013.01); *F24H 1/43* (2013.01); *F24H 1/445* (2013.01);
(Continued)

(58) Field of Classification Search
CPC ........ F24H 1/124; F24H 8/006; F24H 9/0026; F24H 8/00; F24H 9/0084; F24H 1/43; F24H 1/41; F28D 7/024; F28D 1/0472; F28F 1/36

USPC ................. 165/179; 122/15.1, 18.1
See application file for complete search history.

(56) References Cited

U.S. PATENT DOCUMENTS 3,332,477 A * 7/1967 Saunders ................ F24D 3/082
165/163
4,679,528 A * 7/1987 Krans ..................... F23D 14/06
122/18.4
(Continued)

FOREIGN PATENT DOCUMENTS

CN           2646608 Y      10/2004
CN         101113877 A       1/2008
(Continued)

*Primary Examiner* — Avinash Savani
*Assistant Examiner* — Rabeeul Zuberi
(74) *Attorney, Agent, or Firm* — Baker Hostetler LLP (57) ABSTRACT

A heat exchanger for supplying heat includes a housing, a bundle of helical fin-coil tubes, and a flue channel. The housing includes a burner, a water inlet, a water outlet and a flue gas outlet. The burner is disposed on a top portion of the housing and connected to an air/gas mixture unit. The bundle of helical fin-tube coils is disposed tightly, circularly, and coaxially around the burner. The flue channel is disposed below the burner and is formed by a plurality of serpentine bent fin-tube coils. A flow of flue gas vents from the flue channel to the flue gas outlet. The water inlet is connected to the plurality of serpentine bent fin-tube coils which forms the flue channel below the burner. The plurality of serpentine bent fin-tube coils below the burner are connected to the bundle of helical fin-tube coils. The bundle of helical fin-tube coils are connected to the water outlet.

10 Claims, 6 Drawing Sheets

(51) Int. Cl.
    *F24H 1/43*    (2006.01)
    *F24H 9/00*    (2006.01)
    *F24H 1/41*    (2006.01)
    *F28D 7/02*    (2006.01)
    *F24H 1/44*    (2006.01)

(52) U.S. Cl.
CPC ............... *F24H 8/00* (2013.01); *F24H 8/006* (2013.01); *F24H 9/0026* (2013.01); *F24H 9/0084* (2013.01); *F28D 7/024* (2013.01); *Y02B 30/102* (2013.01)

(56) References Cited

U.S. PATENT DOCUMENTS

| | | | | |
|---|---|---|---|---|
| 4,727,737 A | * | 3/1988 | Bryant | B21D 7/024 72/153 |
| 4,776,391 A | * | 10/1988 | Warner | B01D 53/002 165/111 |
| 2002/0148415 A1 | * | 10/2002 | Manley | B21D 53/04 122/40 |
| 2006/0102106 A1 | * | 5/2006 | Le Mer | F28D 7/024 122/32 |
| 2007/0289723 A1 | * | 12/2007 | Koster | B60H 1/00328 165/145 |

FOREIGN PATENT DOCUMENTS

| | | |
|---|---|---|
| CN | 201407817 Y | 2/2010 |
| CN | 201463277 U | 5/2010 |
| CN | 101726109 A | 6/2010 |
| CN | 102901224 A | 1/2013 |
| CN | 202813772 U | 3/2013 |

\* cited by examiner

COIL AND SERPENTINE BENT FIN TUBE CONDENSING HEAT EXCHANGER

CROSS REFERENCE TO RELATED APPLICATIONS

This application is a continuation of and claims priority to PCT/CN2013/083873, filed on Sep. 21, 2013, which claims priority to CN 201210355221.1, filed on Sep. 21, 2012, the disclosures of which are incorporated herein by reference in their entireties.

FIELD OF THE INVENTION

This invention relates generally to equipment in the heating industry field. More particularly, the invention is related to a forced convection helical and serpentine fin tube condensing heat exchanger for supplying heat.

BACKGROUND OF THE INVENTION

As far back as the Middle East oil crisis in the in 20th century, to save the energy, the high efficient condensing boiler was developed in Europe. The outstanding feature of the boiler is that the efficiency is 10% higher than the conventional boiler. Abundant water vapor in the flue is condensed and releases the latent heat of vaporization because the flue temperature can be decreased to below the dew point. This has the effect of energy saving. The condensing heat exchanger is developed and designed based on the principle of the condensing boiler.

The available heat from the combustion flue gas includes two parts: one is the sensible heat (e.g., the sensed heat) in the flue; the other part is the latent heat of water vapor in the flue. The conventional boiler has very high flue temperature because of the limitation of the structure. Therefore only sensible heat can be utilized. However, condensing boiler can not only use sensible heat in the flue but also the latent heat because of the low flue temperature. In this way, the efficiency of the condensing boiler can be greatly increased. In order to absorb the energy in the high temperature flue and collect the condensing water in the low temperature flue, a two-stage heat exchanger is employed normally. The high temperature flue enters the main heat exchanger and then condensing heat exchanger in sequence; the water flows in an opposite direction, the water enters the condensing heat exchanger first, and then enters the main heat exchanger. The water absorbs the sensible heat from the combustion flue gas after absorbing the waste heat of the high temperature flue in the condensing heat exchanger. The flue temperature decreases to a very low temperature after the sensible and latent heat in the heat exchangers has been absorbed by the water. In order to vent the flue securely, the forced convection method is applied. At the same time, the forced convection makes the boiler water absorbs the sensible and latent heat as much as possible. Therefore, the condensing heat exchanger utilizes the energy in the flue which was lost. The effect of the condensing heat exchanger depends on how much the waste energy is used.

The flue gas is normally in an overheated state before entering the condensing heat exchanger. It becomes saturation gradually as the flue temperature decreases and water vapor condenses. According to the test result, the flue at the condensing heat exchanger outlet is close to saturation status when the flue temperature is around 50° C. How close to the saturation status depends on the composition of the flue, the structure of the heat exchanger and heat transfer process. The testing result shows there are still some dead zones or short-circuit in the flue path. It decreases the heat exchanging efficiency.

The heat exchanger of the conventional (non-condensing) boiler is made by carbon steel or cast iron. The flue temperature is higher than 150° C. normally. The heat exchanger is not designed to absorb the sensible and latent heat when the water vapor condensing, and there is no condensate.

The condensing boiler is high efficient boiler with the features of energy saving and environmental protection. It is the future of the boiler industry and has been widely used. The life the condensing boiler will be shortened significantly if the carbon steel or cast iron is used because the boiler generates a lot of acid condensing water. So the material of the condensing heat exchanger should be stainless steel or cast aluminum. At present, most condensing heat exchangers are made with stainless steel tube or cast aluminum.

It is a proven technology to make cast aluminum heat exchanger, but the capacity is limited. It is very difficult to make the big cast aluminum parts. Typically, the bigger the cast, the higher the mold cost, the more complex manufacturing process and the higher scrap rate.

The efficiency can be around 96% maximally by using stainless steel or cast aluminum. However, there will be no condensing water if the return water temperature is higher than 60° C. At this point, only the sensible heat in the flue can be saved. The heat efficiency of the non-condensing boiler is only around 87%.

The conventional heat exchangers are designed according to the requirements from the different customers and the sizes of the heat exchangers are varied very much according to these requirements. Because there are a lot of components involved in the manufacture of heat exchangers, manufacturing many sizes of heat exchangers is not good practice for mass production.

While conventional heat exchangers have relatively good performance, there is still room for significant improvements in performance. A specific list of technical problems in need of improvement include: dead zones of flue flow and insufficient heat exchanging because of the poor heat exchanger structure design; increase the flue side heat transfer surface and efficiency by improving the heat transfer structure; to make the size smaller under the same heat transfer output; to integrate an air pre-heater into the heat exchanger to get the opportunity of third heat exchanging; increase the temperature of the inlet air; and decrease the flue temperature further. Accordingly, there is a need in the art to improve the heat exchanger.

SUMMARY OF THE INVENTION

The foregoing needs are met, to a great extent, by the present invention, wherein aspects of a heat exchanger are provided.

The technical problems that need to be solved include: dead zones of flue flow and insufficient heat exchanging because of the poor heat exchanger structure design; increase the flue side heat transfer surface and efficiency by improving the heat transfer structure; to make the size smaller under the same heat transfer output; to integrate an air pre-heater into the heat exchanger to get the opportunity of third heat exchanging; and increase the temperature of the inlet air and decrease the flue temperature further.

In order to solve the above technical problems, this invention provides the following solutions: A forced convection helical and serpentine bent fin-tube coils condensing heat exchanger including: heat exchanger housing, the burner, and numbers of helical and serpentine bent fin-tube coils inside the housing, water inlet, water outlet, and flue gas outlet on the housing. Burner is connected to the air fuel mixer unit. The burner is located in the upper portion of the heat exchanger housing. A bundle of helical fin-tube coils are installed around the burner tightly and coaxially. Below the burner, the flue channel formed by a group of serpentine bent fin-tube coils and the housing. The flue gas flows along the flue channel to flue outlet. The water inlet is connected to the group serpentine bent fin-tube coils which forms flue channel below the burner. This bundle coils below the burner are leaded to the bundle of helical fin-tube coils around the burner and then connected to the water outlet of the heat exchanger.

As one optimized option, the forced convection helical and serpentine bent fin-tube coils condensing heat exchanger for supplying heat in this invention, the fins on the helical fin-tube coils, the adjacent part are bent or squeezing in a certain angle. The formed surfaces by the bent fins are parallel or in a certain angle.

As one optimized option, the forced convection helical and serpentine bent fin-tube coils condensing heat exchanger for supplying heat in this invention, the fins on the serpentine bent fin-tube coils, the adjacent part are bent or squeezing in a certain angle.

As one optimized option, the forced convection helical and serpentine bent fin-tube coils condensing heat exchanger for supplying heat in this invention, the bundle of helical fin-tube coils are consisted with a numbers of helical fin-tube coils assembled together with the other coils in the opposite orientation.

As one optimized option, the forced convection helical and serpentine bent fin-tube coils condensing heat exchanger for supplying heat in this invention. There are flue baffles outside the helical fin-tube coils around the burner.

As one optimized option, the forced convection helical and serpentine bent fin-tube coils condensing heat exchanger for supplying heat in this invention, the appearance of flue baffle is helically, and the cross section is "V" type with radian, fitting with fins of the fin-tube coils. The outside interfaces of the fin-tube coils in helical are staggered with the openings between the flue baffles.

As one optimized option, the forced convection helical and serpentine bent fin-tube coils condensing heat exchanger for supplying heat in this invention. There are flue baffles inside the serpentine bent fin-tube coils which forms the flue channel. The appearance of flue baffle is strip, and the cross section is "V" type with radian, fitting with fins of the fin-tube coils. The inside interfaces of the fin-tube coils in helical are staggered with the openings between the flue baffles.

As one optimized option, the forced convection helical and serpentine bent fin-tube coils condensing heat exchanger for supplying heat in this invention. The air pre-heater is located inside and along the flue channel, and connected with air inlet. The flue exhaust is a 4-way connector, the flue exhaust on the top, the condensate outlet at the bottom and the air inlet in the middle.

As one optimized option, the forced convection helical and serpentine bent fin-tube coils condensing heat exchanger for supplying heat in this invention. The air pre-heater inside the flue channel is one or several cuboids or cylinder air inlet tube.

As one optimized option, the forced convection helical and serpentine bent fin-tube coils condensing heat exchanger for supplying heat in this invention. The burner is installed in the lower portion of the heat exchanger housing. A bundle of helical fin-tube coils are mounted closely next to each other and around the burner. Above the burner, a flue channel is formed by a group of serpentine bent fin-tube coils. Flue gas vents from the flue channel to flue outlet. The water inlet is connected to the group of serpentine bent fin-tube coils which forms the flue channel below the burner. This group fin-tube coils are connected to another bundle coils around the burner and then connected to the water outlet.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Various embodiments of the present invention provide for an increase the heat exchanger efficiency of a heat exchanger. In embodiments of this invention the heat exchanger has a counter flow design with two-stage heat exchanger. The burner is on the top and the flue outlet on the bottom. After burning, the combustion flue gas flows through the group of fin tubes around the burner and flue baffles located outside these tubes first, then it flows through the serpentine bent fin tubes above the flue channel and the flue baffles under these tubes. Thereafter, the flue gas flows out from the flue outlet along the flue channel and counter flow with inlet air. The water inlet is close to the flue outlet at the bottom, and the water outlet is on the top of the heat exchanger. The water flows through inlet, fin tubes, and the cavities connected to the upper and lower fin tube bundles at both ends, such as front and rear water manifolds, and then out from the outlet. The boiler water supply temperature is higher than exhaust flue temperature by applying this type of count flow structure. In this way, the heat transfer efficiency and the amount of available heat are both able to be increased.

The helical fin-tube coils with the bent fins, fabricated in an additional process are able to increase the heat exchange efficiency significantly in embodiments of this invention. The fin-tube is as the basic element in the forced convection condensing heat exchanger. The heat transfer surface at flue side is increased by adding the fins on the external of the heat exchanger tube. The enhanced heat transfer at flue side increases the heat exchange efficiency, and makes the whole heat exchanger smaller. By the additional manufacturing process on the fins, for example bending, squeezing or cutting, the distance between tubes could be made smaller. Therefore, this makes flue gas have more contact with tubes, adds gas flue turbulences, increase heat transfer and heat exchanger efficiency, which in turn makes heat exchanger smaller.

There are flue baffles outside the circular fin-tubes bundle around the burner and flue baffles inside the fin-tubes bundle formed the cylindrical flue channel. It is good to eliminate the "dead zone" on the flue path and improve the flue distribution on the shell side. In embodiments of this invention, the flue baffles force the flue gas flow along the fins and cross bare tubes very closely, therefore it enhance the heat transfer, and improve flue flow distribution at the shell side. The "dead zone" and "short circuit" at the flue flow path is decreased markedly.

Another additional device is the air pre-heater in embodiments of this invention. It can also increase the efficiency. In embodiments of this invention, the air pre-heater is integrated inside the flue channel of the heat exchanger. When the outdoor temperature is below −20° C. in the winter, the waste heat in the flue warms the coming air. Meanwhile, it decreases the exhaust flue temperature further, and the efficiency of the boiler could reach 96%~98% or more.

The following is specific description of the implementation case. The mentioned implementation case is shown in the attached figures. These figures are used to demonstrate and explain the invention, but not to set the limitation to the invention.

As shown in FIG. 1 through FIG. 15, a heat exchanger 20 has the following major components: Upper water manifold 1; Front shell 2; Heat exchanger housing 3; A bundle of helical fin-tube coils 4; Outer flue baffle 5; Burner 6; Inner flue baffle 7; A plurality of complex serpentine bent fin-tube coils 8; Lower water manifold 9; Rear shell 10; Air pre-heater 11; Flue gas outlet 12; Water outlet 13; Water inlet 14; Cylindrical flue channel 15; Condensate exit 16; and Air inlet 17.

Figure 1:
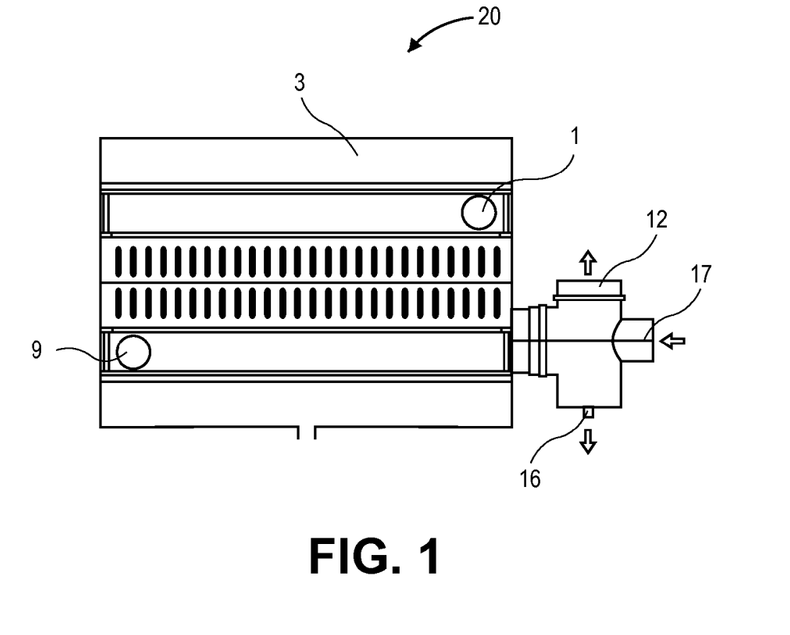
FIG. 1. is a main view of a forced convection helical and serpentine bent fin-tube coils condensing heat exchanger for supplying heat according to an embodiment.
Figure 2:
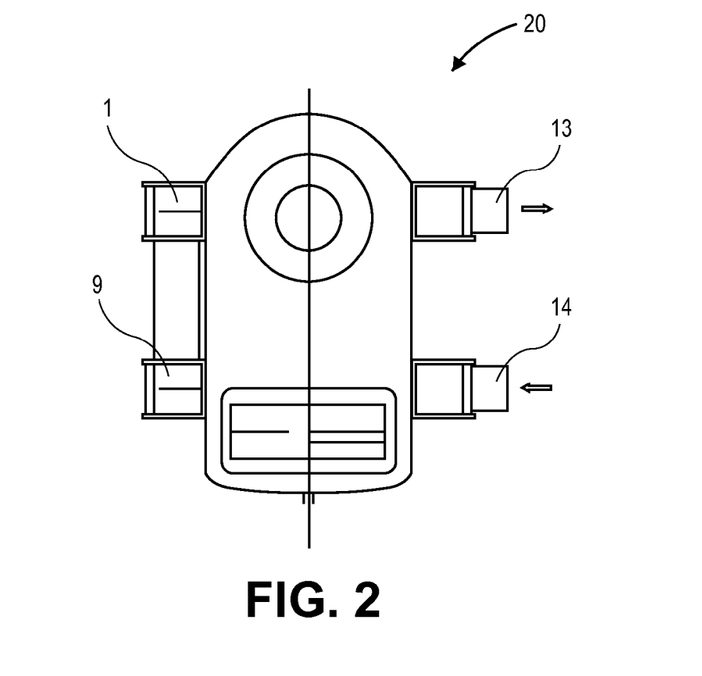
FIG. 2 is a right side sectional view of the forced convection helical and serpentine bent fin-tube coils condensing heat exchanger for supplying heat according to the embodiment of FIG. 1.
Figure 3:
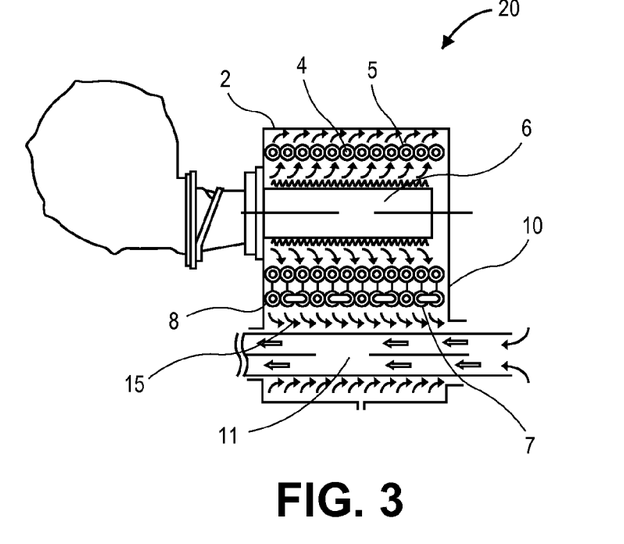
FIG. 3 is a cross sectional view and the operation view of the forced convection helical and serpentine bent fin-tube coils condensing heat exchanger for supplying heat according to the embodiment of FIG. 1.

Refer to FIG. 1 to FIG. 3: the invention describes an embodiment of the forced convection helical and serpentine bent fin-tube coils condensing heat exchanger 20. As shown in FIGS. 1, 2 and 3, the forced convection helical and serpentine bent fin-tube coils condensing heat exchanger 20 includes the heat exchanger housing 3, burner 6, a bundle of helical fin-tube coils 4, and the group of complex serpentine bent fin-tube coils 8. On both sides of the heat exchanger housing 3, there are upper water manifold 1 and lower water manifold pipes 9. On one side, the upper water manifold 1 is connected to the lower water manifold 9. On the other side, the lower water manifold has the water inlet 14 and the upper water manifold 1 has the water outlet 13. Multiple helical fin-tube coils are compact together with each other in opposite orientation. The bundle of helical fin-tube coils 4 are mounted around the burner 6. Below the burner 6 is the flue channel 15 which formed by the heat exchanger housing 3 and a group of complex serpentine bent fin-tube coils 8.

On the two sides of the sidewall of the housing, there are front shell 2 and rear shell 10. In one case, the front shell 2 and the rear shell 1 are welded to the sidewall of the housing. In another cases, the front shell 2 and the rear shell 1 are all made of insulation material.

As figure shown, the heat exchanger housing 3 has water outlet 13 and water inlet 14. The heat exchanger housing also has flue gas outlet 12. The flue gas outlet fitting 12 is a cross. The top opening is flue gas outlet 12. The bottom opening is condensate exit 16. The middle opening is air inlet 17 for the air pre-heater 11.

As shown in FIG. 3, it is demonstrated that the structure sectional and the operation principle of an embodiment of this invention, a forced convection helical and serpentine bent fin-tube coils condensing heat exchanger 20 for supplying heat. In this configuration, the helical and serpentine bent fin-tube coils condensing heat exchanger 20 consists of the housing 3, the burner 6 in the housing 3 and the bundle of complex helical and serpentine bent fin-tube coils, water inlet 14, water outlet 13, and flue gas outlet 12 on the housing 3. The burner 6 is on the upper portion of the heat exchanger housing 3, and it is connected to the air & fuel mixing unit. Disposed around the burner is the helical fin-tube coils bundle 4. The outer flue baffles 5 are mounted outside of the helical fin-tube coils bundle 4. This flue baffle 5 has helical and "V" type with radian in cross section. The interface between the helical fin-tube coils are staggered with the gaps of the outer flue baffles 5. Below the burner 6, the group of complex serpentine bent fin-tube coils 8 forms the flue channel 15 with the exchanger housing 3. The flue vents through the flue channel 15 to the gas outlet 12 on the heat exchanger 20. The air pre-heater 11 which includes one or more square or circular air ducts is located in the flue channel 15. The air pre-heater 11 may include the fresh air inlet pipe. The water inlet 14 is connected to the group of complex serpentine bent fin-tube coils 8 below the burner 6. This bundle of complex coils 8 are soldered, brazed, welded or otherwise connected to the bundle of coils around the burner 6, then connect to the water outlet 13. In other examples, the connection may include various fasteners. In some examples, this connection may be operable to convey thermal energy across the connection.

Below the burner, the inner flue baffle 7 is installed inside the flue channel 15 which formed by a group of complex serpentine bent fin-tube coils and exchanger housing. This inner flue baffle 7 has strip and "V" type with radian in cross section. The inner flue baffles 7 are mounted inside of the serpentine bent fin-tube coils bundle 7. The inside interfaces of the fin-tube coils in serpentine bend are staggered with the opening on the inner flue baffle 7.

The air pre-heater 11 is located inside and along the flue channel 15 and connects to the air inlet device. The flue gas outlet fitting 12 is 4-way connector, the flue exhaust 12 on the top, the condensate outlet 16 at the bottom and the fresh air inlet 17 in the middle.

Figure 4:
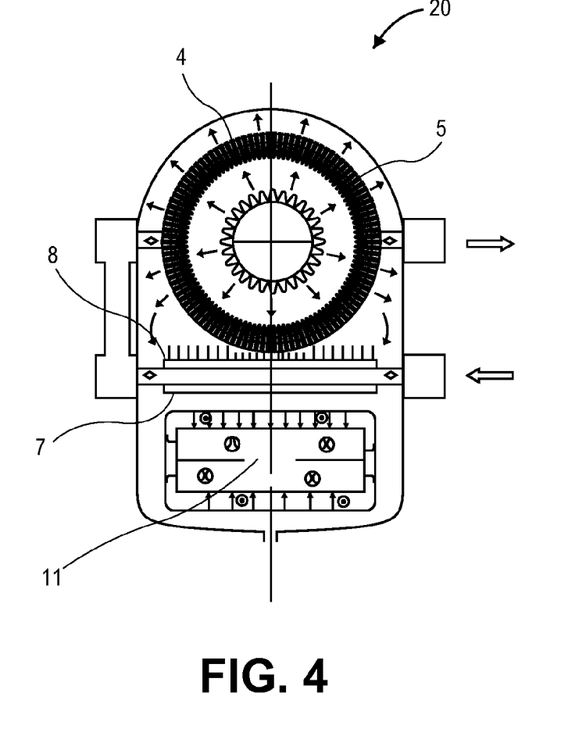
FIG. 4 is a right side sectional view of the forced convection helical and serpentine bent fin-tube coils condensing heat exchanger for supplying heat with one air pre-heater according to the embodiment of FIG. 1.

As shown in FIG. 4, it is demonstrated that the right side structure cross sectional of one case in this invention, the forced convection helical and serpentine bent fin-tube coils condensing heat exchanger 20 for supplying heat with the air pre-heater 11. The bundle of helical fin-tube coils 4 is above the number of complex serpentine bent fin-tube coils 8, and parallel with each other. The burner 6 is located in the upper bundle of helical fin-tube coils 4 and concentric to the coil group 4. Below the burner is the flue channel 15 which forms by a group of complex serpentine bent fin-tube coils 8 and exchanger housing.

In embodiments of this invention, two stage heat exchanging method is applied, and used an overall counter flow structure. The high temperature flue flows downstream through the helical fin-tube coils bundle 4 and the serpentine bent fin-tube coils bundle 8. However, the water flow is opposite to the direction of the flue. It goes through the serpentine bent fin-tube coils bundle 8 firstly, and then the helical fin-tube coils bundle 4. The air pre-heater 11 is located in the flue channel 15. The air gains the heat from the flue further. Therefore, the temperature of the air, which enters the combustion chamber, is increased; and at the same time, the flue temperature can be further reduced.

In this configuration, the water inlet 14, lower bundle of complex serpentine bent fin-tube coils 8, upper water manifold 1, upper bundle of complex helical fin-tube coil 4, lower water manifold 9, and water outlet 13 form the water flow path.

Figure 5:
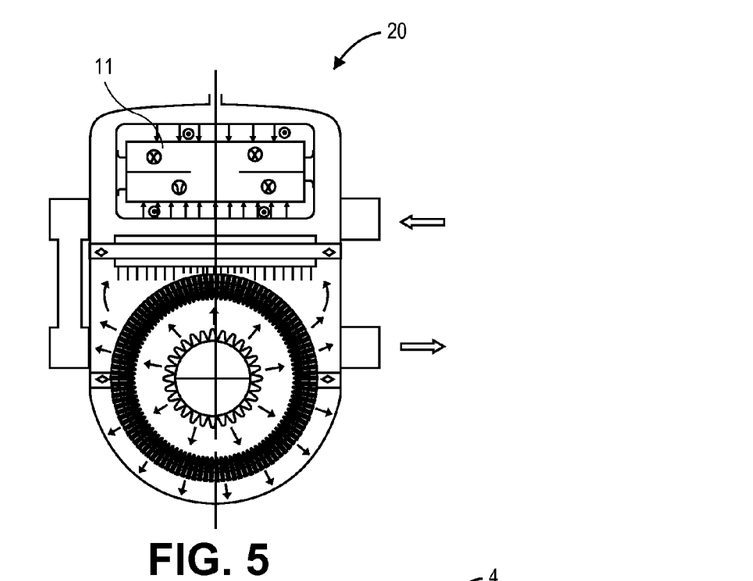
FIG. 5 is a right side sectional view of the forced convection helical fin-tube coils condensing heat exchanger for supplying heat with the air pre-heater in the upper portion of the heat exchanger according to the embodiment of FIG. 1.
Figure 6:
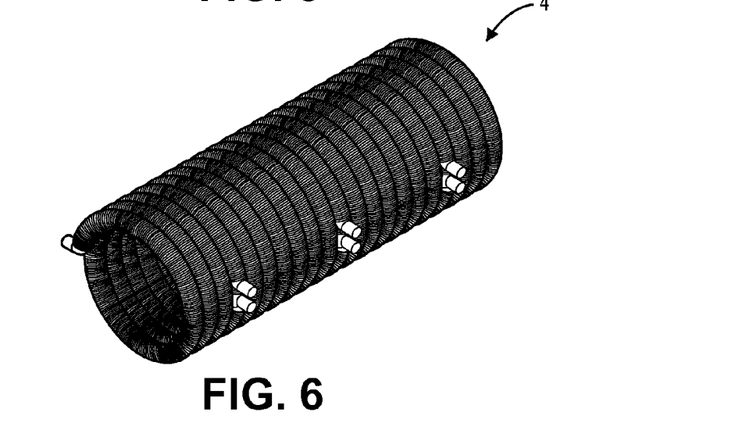
FIG. 6 is a perspective view of a bundle of helical fin-tube coils according to the embodiment of FIG. 1.
Figure 7:
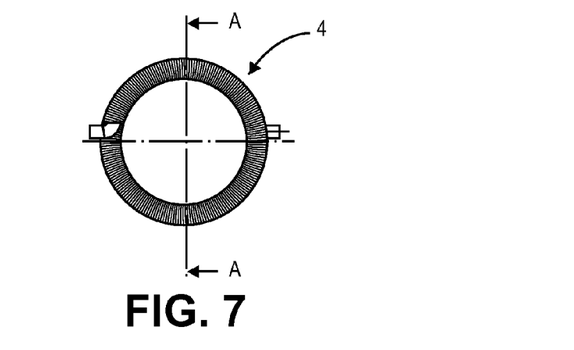
FIG. 7 is a main view of a bundle of helical fin-tube coils according to the embodiment of FIG. 1.
Figure 8:
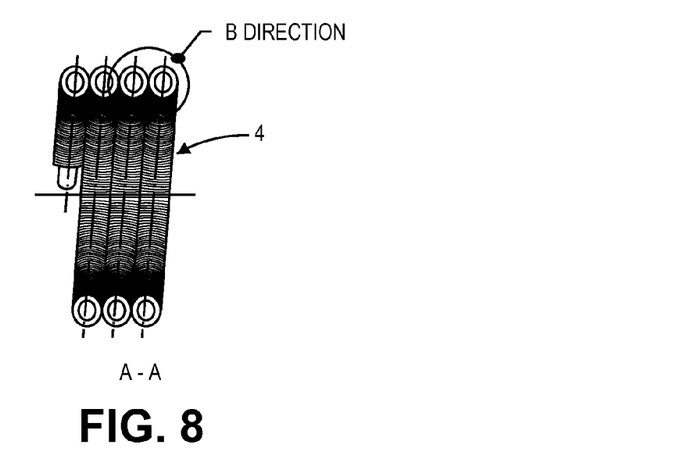
FIG. 8 is a section view of FIG. 7 A-A direction of a bundle of helical fin-tube coils according to the embodiment of FIG. 1.
Figure 9:
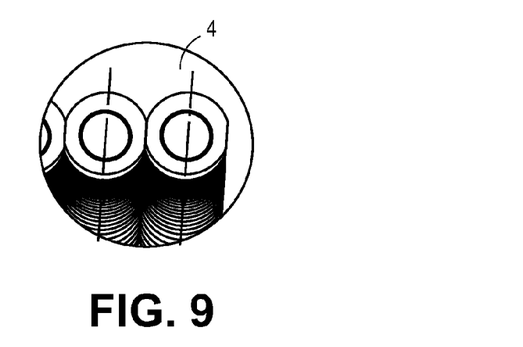
FIG. 9 is an enlarged view of FIG. 8 of a bundle of helical fin-tube coils according to the embodiment of FIG. 1.

As shown in FIG. 5, it demonstrates the right side structure cross sectional of one case in this invention, the forced convection helical and serpentine bent fin-tube coils condensing heat exchanger 20 for supplying heat with an air pre-heater in the upper bundle of serpentine bent fin-tube coils. In this configuration, the burner 6 is located in the lower portion of the heat exchanger housing 3. A bundle of complex helical fin-tube coils 4 are installed around and concentric to the burner 6. Above the burner 6 is a group of serpentine bent fin-tube coils 8 that forms the flue channel 15 with exchanger housing 3. Flue gas vents through the flue channel 15 to the flue gas outlet 12 on the housing. The water inlet 14 is connected to the upper group of coils 8. And the upper group of coils 8 is soldered, brazed, welded or otherwise connected to another bundle of coils 4 around the burner 6, then connected to the water outlet 13. In other examples, the connection may include various fasteners. In some examples, this connection may be operable to convey thermal energy across the connection.

In embodiments of this invention, the heat exchanger 20 is also in a counter flow arrangement, and the high temperature flue flows downstream through the first stage sensible heat transfer and the second stage latent heat transfer. However, the water flow is opposite to the direction of the flue. It goes through the second stage latent heat transfer firstly, and then the first stage sensible heat transfer. The water enters the secondary condensing heat exchanger 20 to absorb flue waste heat, and then enters the first stage to absorb high temperature sensible heat. The air pre-heater 11 located in flue channel 15 makes third heat transfer. The air gains the heat from the flue further. Therefore, the temperature of the air, which enters the combustion chamber, is increased; and at the same time, the flue temperature can be further reduced.

As the FIG. 6 to FIG. 11 show, the bundle of helical fin-tube coils 4 formed by a group of sub coils that are compacted together. The sub-coils are arranged in such a fashion that the other sub-coil is in the opposite orientation. The fins on the coils are pressed or bent. At the location the adjacent turns touch each other. Certainly for the same purpose, the fins tips can be cut off and fins made short. Either ways, the two surfaces formed by bending or cutting the fins on opposite side of the finned tubes, are in parallel or in certain angle. The purpose is to make the coil more compact.

Figure 10:
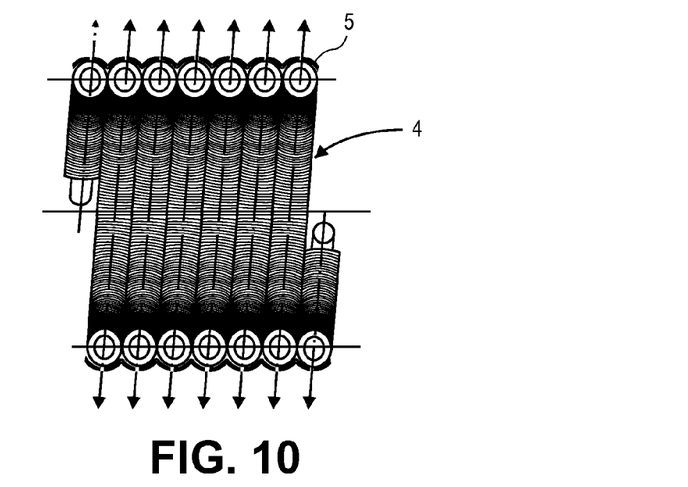
FIG. 10 is an operation view of the flue gas flow through the outside flue baffle according to the embodiment of FIG. 1.

As shown in FIG. 10, it's the operation principle of the outer flue baffle. The outer flue baffles 5 are mounted outside of the helical fin-tube coils bundle 4. This flue baffle 5 has helical and "V" type with radian in cross section. The interface between the helical fin-tube coils are staggered with the holes and slots of the outer flue baffles 5.

Figure 11:
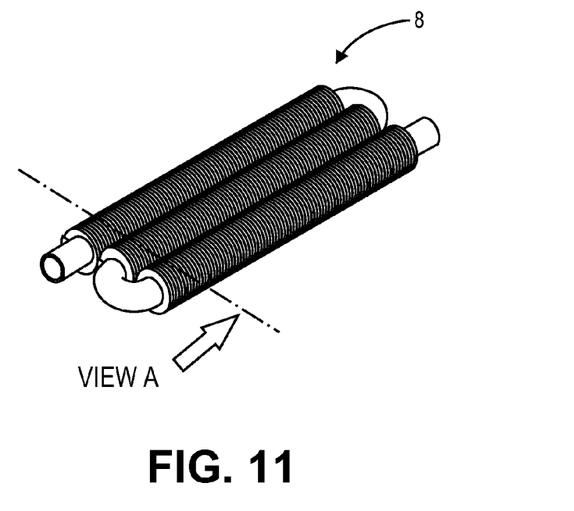
FIG. 11 is a main view of a group of serpentine bent fin-tube coils according to the embodiment of FIG. 1.
Figure 12:
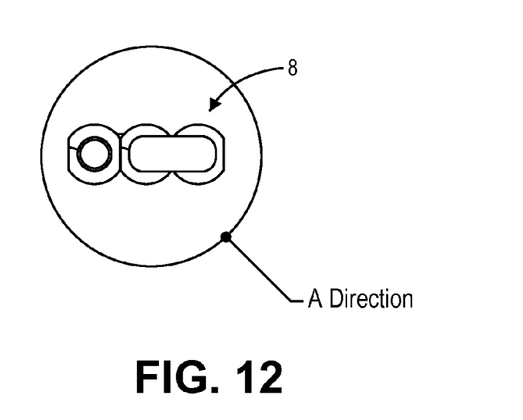
FIG. 12 is an enlarged A-A view of FIG. 11 of a group of serpentine bent fin-tube coils according to the embodiment of FIG. 1.
Figure 13:
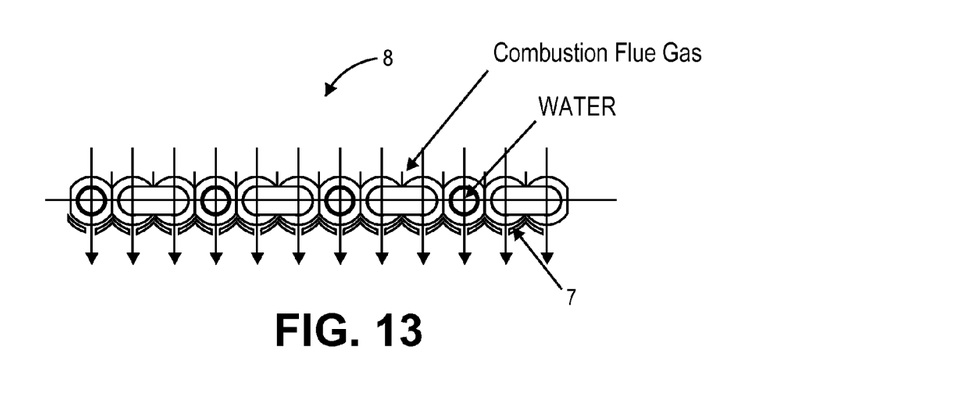
FIG. 13 is an operation view of the flue gas flow through the inner flue baffle according to the embodiment of FIG. 1.

As the FIG. 11 to FIG. 13 show, the straight part of the complex of serpentine bent fin-tube coins 8 are arranged in parallel and in one plane. And fins on the fin-tube coils of the straight part are also processed by bending or pressing the fins inward to a certain angle axially. Certainly the fins can be cut short for the same purpose.

FIG. 13 shows the operation principle of the inner flue baffle. The group of serpentine bent fin-tube coils 8 are assembled together tightly, and forms the flue channel 15 with exchanger housing 3. The inner flue baffles 7 are mounted inside of the serpentine bent fin-tube coils bundle 7. This inner flue baffle 7 has strip and "V" type with radian in cross section. The flow guiding baffle is in touch with the inside surface of the coil. The openings on the flow guiding baffle are staggered with the inside interfaces of the serpentine bent fin-tube coils 8.

Figure 14:
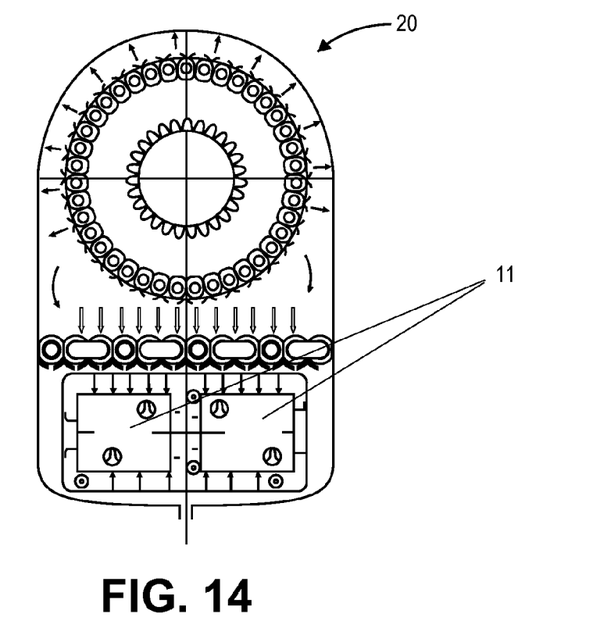
FIG. 14 is a right side sectional of the forced convection helical and serpentine bent fin-tube coils condensing heat exchanger for supplying heat with air pre-heater according to the embodiment of FIG. 1.

FIG. 14 shows a condensing heat exchanger design of the current invention with two air pre-heaters 11. In the flue channel, there are two square or cylinder ducts which are air pre-heaters 11.

Figure 15:
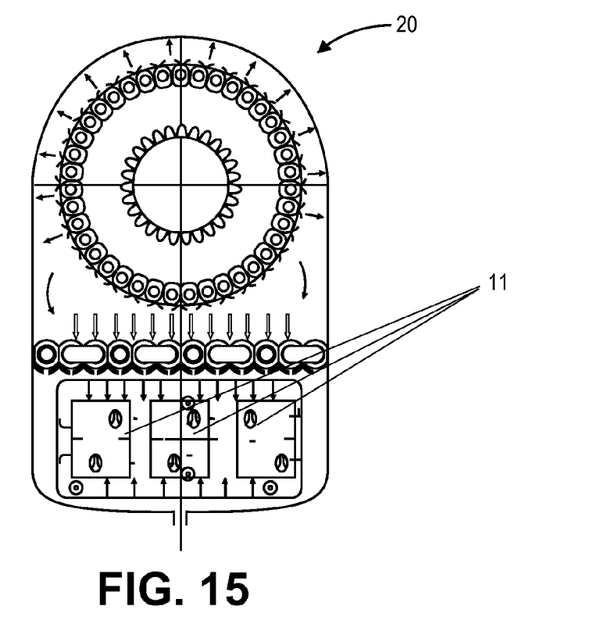
FIG. 15 is a right side sectional of another a forced convection helical and serpentine bent fin-tube coils condensing heat exchanger for supplying heat with air pre-heater in accordance with another embodiment.

FIG. 15 shows a condensing heat exchanger design of the current invention with three air pre-heaters 11. In the flue channel, there are three square or cylinder ducts which are air pre-heaters 11.

In conclusion, the purpose of this invention is to increase the heat transfer area and improve the structure of the heat transfer surface, therefore to increase heat exchange efficiency. The heat exchanger 20 uses the helical and serpentine bent fin-tube coils as the basic element of the forced convection helical and serpentine bent fin-tube coils condensing heat exchanger 20 for supplying heat. It enhances the heat exchange on the flue side and makes the whole heat exchanger 20 smaller.

The flow of the flue is guided very close to the fins and tubes with the application of the outer flue baffles 5 and the inner flue baffle 7. They improve shell side flue passes and velocity distribution, therefore enhance heat exchange. The "dead zone" and "short circuit" of the flue flow can be reduced very much. The air pre-heater 10 is integrated into the heat exchanger 20 very clever. The wasted heat of the flue could warm the entered cold air, and at the same time the flue is cold down further. When the outdoor temperature is below −20° C. in winter, the efficiency could reach 96%~98% or more.

Some key components are designed to be the same to minimize the number of parts in this invention. This will help the mass production, improve the manufacturing process and save the cost.

It shall point out that the demonstration cases above are only for explaining the technical schemes of the invention, not for limiting them. Although the detailed explanations are listed with only optimum cases in the invention, the technical persons in this field shall know that the technical scheme can be modified and replaced, but it does not separate from the spirit in this invention, and shall be included in the scope of the claims.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heat exchanger for supplying heat, comprising:
   a housing includes:
     a burner;
     a water inlet;
     a water outlet; and
     a flue gas outlet;
   the burner is disposed on a top portion of the housing and connected to an air/gas mixture unit;
   a bundle of helical bent fin-tube coils having a plurality of fins disposed about a tube, the helical bent fin-tube coils being disposed tightly, circularly, and coaxially around the burner, wherein for all of the helical bent fin-tube coils disposed between two other of the helical bent fin-tube coils, a spacing between adjacent ones of the helical bent fin-tube coils is reduced by bending each of the plurality of fins only at a location where the adjacent ones of the helical bent fin-tube coils touch and for all of the helical bent fin-tube coils disposed adjacent to only one other of the helical bent fin-tube coils, a spacing between adjacent ones of the helical bent fin-tube coils is reduced by bending each of the plurality of tins only at a location where the adjacent ones of the helical bent fin-tube coils touch and at a location opposite to where the adjacent ones of the helical bent fin-tube coils touch;
   a flue channel is disposed below the burner, the flue channel being formed by a plurality of serpentine bent fin-tube coils and the housing, wherein a flow of flue gas vents from the flue channel to the flue gas outlet and wherein for all of the serpentine bent fin-tube coils disposed between two other of the serpentine bent fin-tube coils, a spacing between adjacent ones of the serpentine bent fin-tube coils is reduced by bending each of the plurality of fins only at a location where the adjacent ones of the serpentine bent fin-tube coils touch and for all of the serpentine bent fin-tube coils disposed adjacent to only one other of the serpentine bent fin-tube coils, a spacing between adjacent ones of the serpentine bent fin-tube coils is reduced by bending each of the plurality of fins only at a location where the adjacent Ones of the serpentine bent fin-tube coils touch and at a location opposite to where the adjacent ones of the serpentine bent fin-tube coils touch;
   the water inlet is connected to the plurality of serpentine bent fin-tube coils which forms the flue channel below the burner;
   the plurality of serpentine bent fin-tube coils below the burner are connected to the bundle of helical fin-tube coils; and
   the bundle of helical fin-tube coils are connected to the water outlet.

2. The heat exchanger according to claim 1, wherein a plurality of fins on the bundle of helical fin-tube coils are bent at a predetermined angle and the bent respective surfaces of the plurality of fins are parallel or at a predetermined angle.

3. The heat exchanger according to claim 1, wherein a plurality of fins disposed on the plurality of serpentine bent fin-tube coils are bent at a predetermined angle.

4. The heat exchanger according to claim 1, wherein the plurality of serpentine bent fin-tube coils include pairs of helical fin-tube coils assembled together with corresponding helical fin-tube coils that are coiled in the opposite orientation.

5. The heat exchanger according to claim 1, further comprising:
   a plurality of outer flue baffles installed around the bundle of the helical fin-tube coils.

6. The heat exchanger according to claim 5, wherein the outer flue baffle include a "V" type cross section with a radiused portion configured to mate with ones of the fins of the bundle of helical fin-tube coils and wherein the interfaces of the bundle of helical fin-tube coils is disposed in a circle that are staggered with the openings between the plurality of outer flue baffles.

7. The heat exchanger according to claim 1, further comprising:
   an inner flue baffle disposed below the burner is installed inside the plurality of serpentine bent fin-tube coils which formed the flue channel, wherein the inner flue baffle is strip and "V" type with a radiused cross section and the inner flue baffle is configured to mate with the fins of the serpentine bent fin-tube coils and wherein a plurality of inside interfaces of the serpentine bent fin-tube coils are staggered with the openings of the inner flue baffle.

8. The heat exchanger according to claim 1, further comprising:
   an air pre-heater disposed inside the flue channel, wherein the air pre-heater is located inside and along the flue channel and connected with an air inlet, the flue exhaust being a 4-way connector, wherein the flue exhaust is disposed on a top portion of the 4-way connector; and a condensate outlet disposed at a bottom portion of the 4-way connector and the air inlet being disposed in a middle portion of the 4-way connector.

9. The heat exchanger according to claim 8, wherein the air pre-heater disposed inside the flue channel includes one or more cuboidal or cylindrical air inlet tubes.

10. A heat exchanger comprising:
a housing having a flue gas outlet and a water outlet;
a burner disposed in a lower portion of the housing;
a bundle of helical bent fin-tube coils having a plurality of fins disposed about a tube, the helical bent fin-tube coils being mounted adjacent to each other around the burner, wherein for all of the helical bent fin-tube coils disposed between two other of the helical bent fin-tube coils, a spacing between adjacent ones of the helical bent fin-tube coils is reduced by bending each of the plurality of fins only at a location where the adjacent ones of the helical bent fin-tube coils touch and for all of the helical bent fin-tube coils disposed adjacent to only one other of the helical bent fin-tube coils, a spacing between adjacent ones of the helical bent fin-tube coils is reduced by bending each of the plurality of fins only at a location where the adjacent ones of the helical bent fin-tube coils touch and at a location opposite to where the adjacent ones of the helical bent fin-tube coils touch;

a flue gas channel is disposed above the burner, the flue gas channel being formed by a plurality of serpentine bent fin-tube coils and the housing, wherein a flow of flue gas is vented from the flue gas channel to the flue gas outlet and wherein for all of the serpentine bent fin-tube coils disposed between two other of the serpentine bent fin-tube coils, a spacing between adjacent ones of the serpentine bent fin-tube coils is reduced by bending each of the plurality of fins only at a location where the adjacent ones of the serpentine bent fin-tube coils touch and for all of the serpentine bent fin-tube coils disposed adjacent to only one other of the serpentine bent fin-tube coils, a spacing between adjacent ones of the serpentine bent fin-tube coils is reduced by bending each of the plurality of fins only at a location where the adjacent ones of the serpentine bent fin-tube coils touch and at a location opposite to where the adjacent ones of the serpentine bent fin-tube coils touch;

a water inlet connected to the plurality of serpentine bent fin-tube coils, wherein the plurality of serpentine bent fin-tube coils are connected to the bundle of helical fin-tube coils which are then connected to the water outlet.

* * * * *